United States Patent [19]
Rodgers et al.

[11] Patent Number: 5,860,734
[45] Date of Patent: Jan. 19, 1999

[54] RESILIENTLY MOUNTED ROADING LAMP

[75] Inventors: Travis W. Rodgers, Clayton, N.C.; Richard L. Slutz, Sparland, Ill.

[73] Assignee: Caterpillar Inc., Peoria, Ill.

[21] Appl. No.: 807,182

[22] Filed: Feb. 27, 1997

[51] Int. Cl.$^6$ .............................. F21V 15/04; F21V 15/00
[52] U.S. Cl. ......................... 362/369; 362/370; 362/368; 362/390; 362/61
[58] Field of Search ............................. 362/61, 368, 369, 362/370, 371, 390

[56] References Cited

U.S. PATENT DOCUMENTS

| | | | |
|---|---|---|---|
| 4,422,136 | 12/1983 | Newman et al. | 362/390 |
| 4,443,832 | 4/1984 | Kanamori et al. | 362/84 |
| 4,972,301 | 11/1990 | Kasboske | 362/61 |
| 5,613,765 | 3/1997 | Gill | 362/269 |

*Primary Examiner*—Ira S. Lazarus
*Assistant Examiner*—Ljiljana V. Ciric
*Attorney, Agent, or Firm*—O. G. Pence

[57] ABSTRACT

Roading lamp assemblies for use on a construction machine are typically mounted to a frame assembly or similar structure. During operation of the construction machine, the roading lamp assembly experiences vibration which may damage an illuminating apparatus therein. The present invention includes utilization of inner and outer resilient members on either side of a housing assembly which is secured to the frame through a plate member and bolts. The plate member has a plurality of legs which extend through a plurality of mounting holes in the housing assembly, the inner and outer resilient members and the frame. The pair of resilient members are pre-loaded through adequate torqueing of the bolts in cooperation with the plurality of legs to protect the illumination apparatus from damage during extreme vibration. Additionally, a harness assembly which supplies electrical energy to a lamp in the roading lamp assembly passes internally through the frame to an interior chamber in the housing assembly. The isolation of the harness assembly from the atmosphere provides protection from debris.

8 Claims, 3 Drawing Sheets

Fig-4
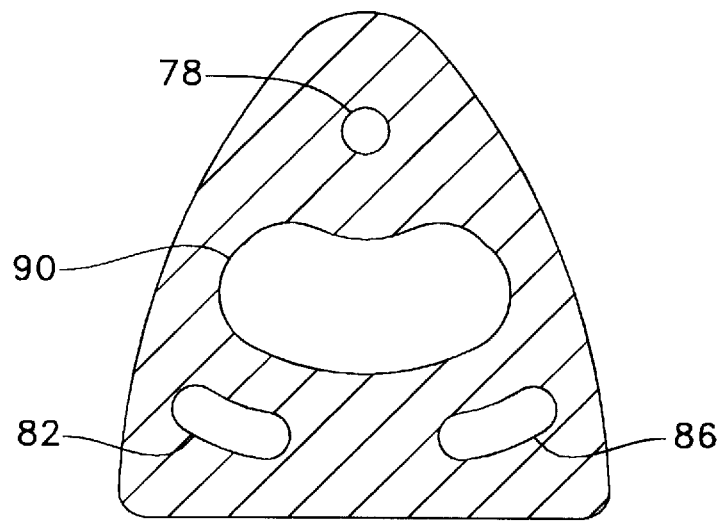
Fig-5
Fig-6
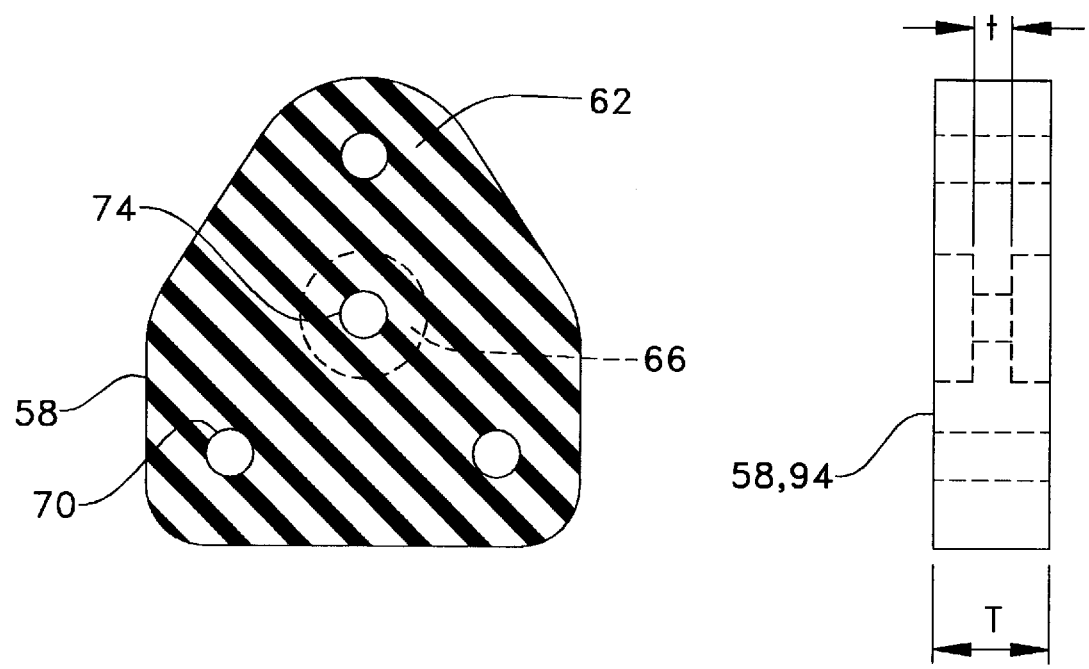

RESILIENTLY MOUNTED ROADING LAMP

TECHNICAL FIELD

This invention relates generally to a roading lamp assembly for use on a construction machine and more particularly to a vibration reducing mount used with the roading lamp assembly.

BACKGROUND ART

Components which are mounted to a frame on a construction machine, such as a roading lamp assembly, typically experience substantial vibration during operation of the construction machine. The vibration incurred may damage or shorten the life of the roading lamp assembly especially since the roading lamp assembly is normally mounted directly to the frame in direct metal-to-metal contact. Therefore, various methods have been used to protect the roading lamp assembly from the vibration. One such method is the utilization of a rubber mount on the bolt stem. Unfortunately, the rubber mount on the bolt stem is generally not sufficient to protect the delicate internal apparatus within the roading lamp assembly since the rubber mount only has limited, positional vibration control. Additionally, a harness assembly which is necessary to conduct electrical energy to the internal apparatus of the roading lamp assembly has been run externally from the construction machine to the roading lamp assembly which increases the possibility of damage thereto.

The present invention is directed to overcoming the problems as set forth above.

DISCLOSURE OF THE INVENTION

In one aspect of the present invention, a resiliently mounted lamp assembly is disclosed which is adapted for use with a frame structure defining a plurality of mounting holes. A housing assembly has inner and outer surfaces which define an internal chamber, a mounting end portion adjacent the frame and a lamp end portion opposite the mounting end portion. The mounting end portion defines a plurality of mounting holes therethrough substantially coaxially aligned with the plurality of mounting holes in the frame. An illuminating apparatus is mounted within the internal chamber at the lamp end portion of the housing assembly. The illuminating apparatus has a plurality of wires and a lamp connected therein. A source of electrical energy is connected to the plurality of wires in the illuminating apparatus for illuminating the lamp. A first resilient member is disposed within the internal chamber with a first surface positioned against the inner surface of the housing assembly adjacent the mounting end portion. The first resilient member defines a plurality of mounting holes therethrough substantially coaxially aligned with the plurality of mounting holes in the mounting end portion of the housing assembly. A second resilient member is disposed between the outer surface of the housing assembly adjacent the mounting end portion and the frame and defines a plurality of mounting holes therethrough substantially coaxially aligned with the plurality of mounting holes in the mounting end portion of the housing assembly. A plate member is disposed within the internal chamber and has a substantially flat portion with a mounting surface positioned against a second surface of the first resilient member and a plurality of tubular legs which extends through the mounting holes of the first resilient member, housing assembly, second resilient member and the frame. Bolting means extend through the tubular legs for securing the lamp assembly to the frame.

The present invention, through the use of a resilient mount which is simple and easy to manufacture, provides sufficient isolation and damping for protecting a lamp assembly from extreme vibration.

BRIEF DESCRIPTION OF THE DRAWINGS

FIG. 4 is a section view taken along line 4—4 of FIG. 3;

FIG. 5 is a section view taken along line 5—5 of FIG. 3; and

FIG. 6 is a side view of inner and outer resilient members embodied in the present invention.

BEST MODE FOR CARRYING OUT THE INVENTION

Figure 1:
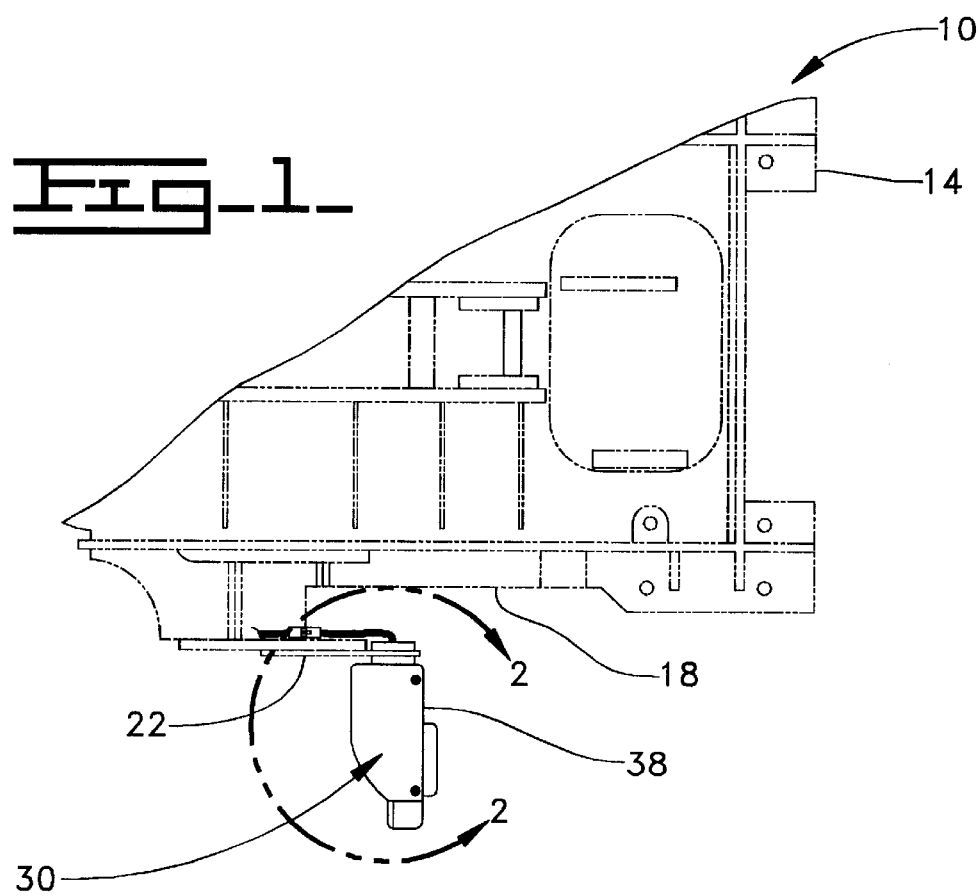
FIG. 1 is a partial top view of a frame assembly for a construction machine embodying the present invention.
Figure 2:
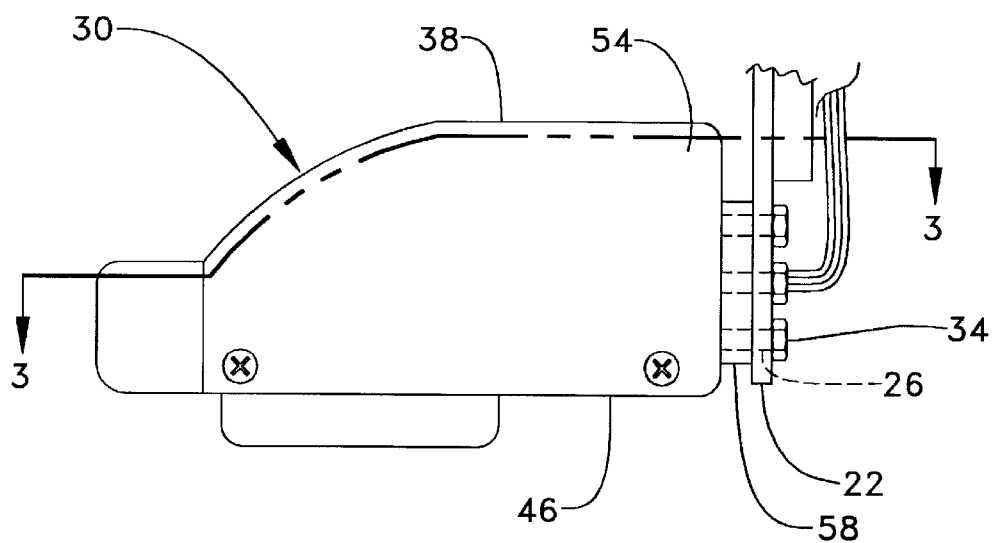
FIG. 2 is an enlarged view of the area encircled by 2—2 of FIG. 1.

A construction machine 10 with a frame assembly 14 is partially shown in FIG. 1. Although a frame assembly 14 is used in conjunction with the present invention, it should be understood that any mounting component may be utilized. The frame assembly 14 has a pair of side rails, one of which is shown at 18. For purposes of clarity, only one side of the frame assembly will be described in detail. It should be understood, however, that the present invention may be provided on either side of the frame assembly. A source of electrical energy 20, such as a battery or any other suitable electrical source, is connected to the frame assembly 14 as can be seen more clearly in FIG. 3. A mounting bracket 22 is connected to the side rail 18 in any suitable manner, such as welding or bolting. The mounting bracket 22 defines a plurality of mounting holes, one of which is shown at 26 and can be seen more clearly in FIGS. 2 and 3. The plurality of mounting holes 26 extend entirely through the mounting bracket 22. A central opening 28 is further defined through the mounting bracket 22. A roading lamp assembly 30 is connected to the mounting bracket 22 through the plurality of mounting holes 26 by means of a plurality of bolts, one of which is shown at 34.

Figure 3:
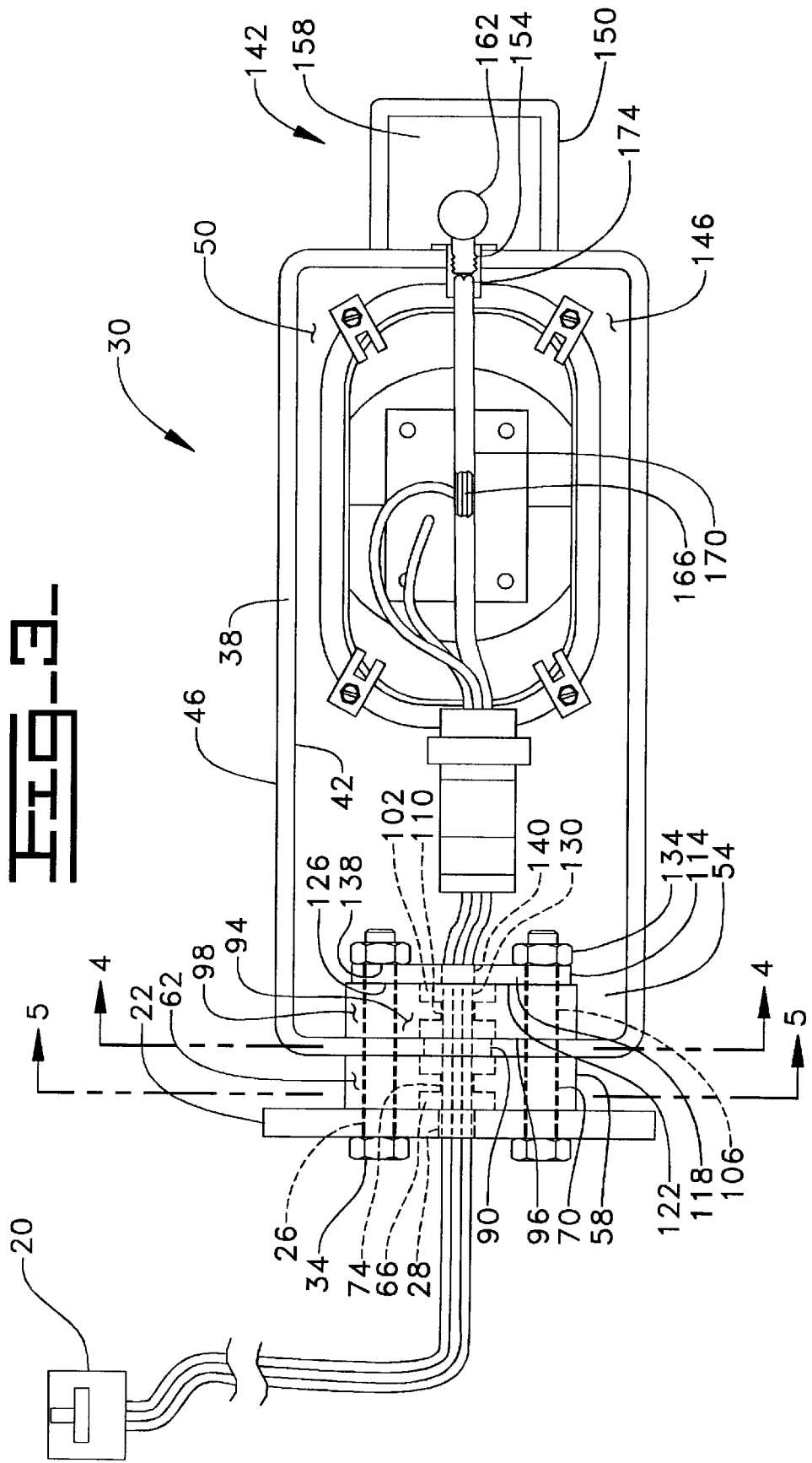
FIG. 3 is a partial section view taken along line 3—3 of FIG. 2.

The roading lamp assembly 30, as seen more clearly in FIGS. 3–5, includes a housing assembly 38 which has inner and outer surfaces 42, 46. The inner surface 42 defines a hollow interior chamber 50. A mounting end portion 54 of the housing assembly 38 is adjacent the mounting bracket 22 and is separated therefrom by an outer resilient member 58. The outer resilient member 58, as is seen more clearly in FIG. 5, has a substantially triangular shape and is made from elastomeric material of any suitable type, such as natural rubber or silicon. The outer resilient member 58 has an outer portion 62 with a predetermined thickness 'T' extending along the circumference thereof and a central portion 66 with a predetermined thickness 't' less than the predetermined thickness 'T' of the outer portion. The outer resilient member 58 defines a plurality of mounting holes therethrough at the outer portion 62, one of which is shown at 70. The mounting holes 70 through the outer resilient member 58 are substantially coaxially aligned with the plurality of mounting holes 26 in the mounting bracket 22. An opening 74 is defined through the central portion 66 of the outer resilient member 58 and has a predetermined diameter. The mounting end portion 54 of the housing assembly 38 defines a plurality of mounting holes 78, 82, 86, which can be seen more clearly in FIG. 4. The plurality of mounting holes 78, 82, 86 in the mounting end portion 54 extend through the outer surface 46 of the housing assembly 38 and into the interior chamber 50. A pair of the plurality of mounting holes 82, 86 in the mounting end portion 54 have a kidney-like shape which is slotted to provide a larger predetermined area than that of the remaining mounting hole 78. Each of the plurality of mounting holes 78, 82, 86 in the mounting end portion 54 are substantially coaxially aligned with a respective mounting hole 26 in the mounting bracket 22 and in the outer resilient member 58. The mounting end portion 54 defines an adjustment hole 90 therein which extends through the outer surface 46 of the housing assembly 38 and into the interior chamber 50 and is substantially coaxially aligned with the opening 74 in the central portion 66 of the outer resilient member 58. The adjustment hole 90 has a kidney-like shape similar to the pair of the plurality of mounting holes 82, 86 in the mounting end portion 54 but has a larger predetermined area than the predetermined area of the mounting holes 82, 86. An inner resilient member 94, substantially identical to the outer resilient member 58, is seated at a first surface 96 against the inner surface 42 of the housing assembly 38 within the interior chamber 50. The inner resilient member 94 has a substantially identical shape and is made from the same material as the outer resilient member 58 or from any material of a suitable type as described for the outer resilient member 58. The inner resilient member 94 has an outer portion 98 with a predetermined thickness 'T' extending along the circumference thereof and a central portion 102 with a predetermined thickness 't' less than the predetermined thickness 'T' of the outer portion, as can be seen more clearly in FIG. 6 along with the identical features of the outer resilient member 58. The inner resilient member 94 defines a plurality of mounting holes therethrough, one of which is shown at 106. The mounting holes 106 through the inner resilient member 94 are substantially coaxially aligned with the plurality of mounting holes 26 in the mounting bracket 22, the outer resilient member 58 and the mounting end portion 54 of the housing assembly 38. An opening 110 is defined through the central portion 102 of the inner resilient member 94 and has a predetermined diameter. The opening 110 is substantially coaxially aligned with the adjustment hole 90.

A plate member 114 is seated at a planar portion 118 of a mounting surface 122 against a second surface 126 of the inner resilient member 94. A plurality of tubular legs, one of which is shown at 130, are welded to and extend from the planar portion 118 of the mounting surface 122 a predetermined distance. It should be understood that although the plurality of legs 130 are welded to the mounting surface 122 any suitable attachment may be used. Each of the plurality of legs 130 are spaced sufficiently to extend through the series of coaxially aligned mounting holes in the inner resilient member 94, the mounting end portion 54 of the housing assembly 38, the outer resilient member 58 and the mounting bracket 22. Each of the plurality of legs 130 extends a predetermined distance through the mounting bracket 22 so that the bolts 34 may be adequately tightened within one of a plurality of nuts, shown at 134, connected to an inner surface 138 of the plate member 114 opposite the mounting surface 122 to secure the roading lamp assembly 30 against the frame 14 of the construction machine 10. A central opening 140 is defined through the plate member 114 and is substantially coaxially aligned with the central opening 28 in the mounting bracket 22.

An illuminating apparatus 142 is mounted within the interior chamber 50 at a lamp end portion 146 of the housing assembly 38 opposite the mounting end portion 54. The illuminating apparatus 142 has an electrical housing 150 connected in any suitable manner to the inner surface 42 of the housing assembly 38. The electrical housing 150 defines a threaded bore 154 at a distal end portion 158 thereof. A lamp 162 of any suitable type is threadably received within the threaded bore 154. A plurality of wires 166 secured within a harness assembly 170 are connected to and extend from the electrical energy source 20 through the central openings 28, 140 in the mounting bracket 22 and the plate member 114, the openings 74, 110 in the first and second resilient members 58, 94, and the adjustment hole 90 in the mounting end portion 54 of the housing assembly 38 and terminate within the internal chamber 50 at a connection point 174 with the lamp 162 in substantial internal isolation.

INDUSTRIAL APPLICABILITY

During operation of the construction machine 10, significant vibration may be experienced by the frame assembly 14 which, in turn, causes vibration within the roading lamp assembly 30. The damping capabilities of the inner and outer resilient members 58, 94 are determined through the use of the plate member 114. This occurs by selecting the predetermined length of the tubular legs 130 which permit the required torque on the bolts 34 during tightening which provides a predetermined pre-load to the inner and outer resilient members 58, 94. The position of and area covered by the inner and outer resilient members 58, 94 and the damping capabilities provided by the pre-load substantially eliminates damage to the illuminating apparatus 142 by limiting the vibration which is incurred by the entire roading lamp assembly 30.

Adjustments in the position of the lamp assembly 30 on the frame assembly 14 can be made by loosening the bolts 34 securing the lamp assembly 30 to the frame assembly 14 and moving the lamp assembly 30 within the range of motion provided by the slotted mounting holes 82, 86. The harness assembly 170 and plurality of wires 166 therein are protected during this adjustment process due to the large adjustment hole 90 in the mounting end 54 of the housing assembly 38. The large adjustment hole 90 allows the housing assembly 38 to be moved substantially within the range of motion provided by the slotted elongated or mounting holes 82, 86 therein without damage to the plurality of wires 166 within the harness assembly 170. Additionally, the openings 74, 110 in the central portion 66, 102 of the inner and outer resilient members 58, 94 are surrounded by material which has the thickness 't'. The thickness 't' allows the harness assembly 170 to easily pass through the inner and outer resilient members 58, 94 while providing a protective elastomeric seal thereto. The internal location of the harness assembly 170 from the construction machine 10 to the interior chamber 50 of the housing assembly 38 through central openings in the mounting bracket 22, inner and outer resilient members 58, 94, housing assembly 38 and plate member 114 virtually isolates the harness assembly 170 from any damage caused by debris or other external forces.

Other aspects, objects and advantages of this invention can be obtained from a study of the drawings, disclosure and the appended claims.

We claim:

1. A resiliently mounted lamp assembly including a frame defining a plurality of mounting holes and adapted for use with the frame said lamp assembly comprising:

a housing assembly having inner and outer surfaces defining an internal chamber, a mounting end portion adjacent the frame and a lamp end portion opposite the mounting end portion, the mounting end portion defining a plurality of mounting holes therethrough substantially coaxially aligned with the plurality of mounting holes in the frame;

an illuminating apparatus mounted within the internal chamber at the lamp end portion of the housing assembly, the illuminating apparatus having a plurality of wires and a lamp connected therein;

a source of electrical energy connected to the plurality of wires in the illuminating apparatus for illuminating the lamp;

a first resilient member disposed within the internal chamber with a first surface positioned against the inner surface of the housing assembly adjacent the mounting end portion and defining a plurality of mounting holes therethrough substantially coaxially aligned with the plurality of mounting holes in the mounting end portion of the housing assembly;

a second resilient member disposed between the outer surface of the housing assembly adjacent the mounting end portion and the frame and defining a plurality of mounting holes therethrough substantially coaxially aligned with the plurality of mounting holes in the mounting end portion of the housing assembly;

a plate member disposed within the internal chamber and having a substantially flat portion with a mounting surface positioned against a second surface of the first resilient member and a plurality of tubular legs extending through the mounting holes of the first resilient member, housing assembly, second resilient member and the frame; and bolting means extending through the tubular legs for securing the lamp assembly to the frame.

2. The resiliently mounted lamp assembly of claim 1, wherein the plurality of wires are defined within a harness assembly extending from the frame and terminating in the internal chamber of the housing assembly in substantial isolation from the atmosphere.

3. The resiliently mounted lamp assembly of claim 2, wherein the mounting end portion of the housing assembly defines an adjustment hole through the mounting end portion and the first through and second resilient members, the plate member and the frame each having a defined opening therethrough substantially coaxially aligned with the adjustment hole in the mounting end portion of the housing assembly.

4. The resiliently mounted lamp assembly of claim 3, wherein the first and second resilient members each have an outer portion with a predetermined thickness and a central portion with a predetermined thickness less than the predetermined thickness of the outer portion and the openings within the first and second resilient members extend through the central portion of the first and second resilient members.

5. The resiliently mounted lamp assembly of claim 4, wherein the harness assembly extends through the openings in the central portion of the first and second resilient members, the opening in the plate member, the opening in the frame and the adjustment hole on the mounting end portion of the housing assembly.

6. The resiliently mounted lamp assembly of claim 1, wherein at least two of the plurality of mounting holes in the mounting end portion of the housing assembly are elongated.

7. The resiliently mounted lamp assembly of claim 1, wherein the first and second resilient members are made from an elastomeric material.

8. The resiliently mounted lamp assembly of claim 1, wherein torquing of the bolting means brings the tubular legs in contact with the inner surface of the frame to provide a preselected amount of compression of the first and second resilient members for damping the lamp assembly.

\* \* \* \* \*